United States Patent [19]

McCulloch

[11] Patent Number: 4,541,052
[45] Date of Patent: Sep. 10, 1985

[54] MOTOR VEHICLE POWER OUTPUT REGULATION CONTROL SYSTEM

[75] Inventor: Dean E. McCulloch, Washington, Mich.

[73] Assignee: General Motors Corporation, Detroit, Mich.

[21] Appl. No.: 451,195

[22] Filed: Dec. 20, 1982

[51] Int. Cl.³ .................... G05D 13/58; B60K 31/00
[52] U.S. Cl. ............................. 364/431.07; 180/179; 364/424.1
[58] Field of Search ............... 364/424, 424.1, 426; 180/175, 176, 177, 178, 179

[56] References Cited

U.S. PATENT DOCUMENTS

| | | | |
|---|---|---|---|
| 2,897,906 | 8/1959 | Brueder | 180/175 |
| 3,229,546 | 1/1966 | Nallinger et al. | 180/175 X |
| 3,886,915 | 6/1975 | Taplin | 180/179 X |
| 4,046,213 | 9/1977 | Larson | 364/426 X |
| 4,138,723 | 2/1979 | Nehmer et al. | 364/426 X |
| 4,157,126 | 6/1979 | Collonia | 180/176 |
| 4,248,321 | 2/1981 | Collonia | 180/179 |
| 4,380,799 | 4/1983 | Allard | 364/426 |
| 4,389,910 | 6/1983 | Lockhart | 364/424.1 |
| 4,401,075 | 8/1983 | O'Keefe, Jr. et al. | 364/426 X |
| 4,408,293 | 10/1983 | Avins | 364/426 |

Primary Examiner—Felix D. Gruber
Attorney, Agent, or Firm—Mark A. Navarre

[57] ABSTRACT

Vehicle operating conditions including vehicle acceleration and the position of an operator manipulated accelerator pedal are monitored to determine whether transient or steady state operation is indicated. When transient operation is indicated, the vehicle power output is brought into correspondence with a power command determined according to accelerator pedal position. When steady state operation is indicated, the vehicle power output is brought into correspondence with a power command determined according to the difference between the vehicle velocity and a remembered velocity.

8 Claims, 6 Drawing Figures

MOTOR VEHICLE POWER OUTPUT REGULATION CONTROL SYSTEM

This invention relates to a motor vehicle control system responsive to the position of an operator-manipulated accelerator pedal and vehicle operating conditions for regulating the vehicle driveline power output.

In a conventional motor vehicle, an operator-manipulated accelerator pedal is connected via a suitable linkage mechanism to the engine throttle for controlling the engine power output. Under normal driving conditions, the operator manipulates the accelerator pedal in a manner to accelerate the vehicle to a desired velocity at a desired rate, and thereafter to maintain the vehicle velocity substantially constant. When a different velocity is desired, the operator further manipulates the accelerator pedal in a manner to accelerate the vehicle to the new velocity at a desired acceleration rate. In other words, the accelerator pedal is manipulated both to maintain a given speed and to control the rate of acceleration or driveline power output in the transitions between periods of operation at substantially constant speed.

Due to road load variations and the nonlinear relation between the driveline power output and the accelerator pedal position, the accelerator pedal manipulation required to achieve the desired velocity and acceleration rates is considerable. As the operator of the vehicle attempts to compensate for the nonlinearity and the road load variations by making further accelerator pedal adjustments, the driveline power output often overshoots that which is required, thereby reducing the fuel economy that might otherwise be obtained. This problem is pronounced in vehicles having stepped speed ratio transmissions and low power-to-weight ratios.

Accordingly, it has been proposed to adjust vehicle engine throttle position and transmission gear ratio in a manner to develop a driveline power output corresponding to a power command determined according to accelerator pedal position. One such system is disclosed in the U.S. patent application Ser. No. 234,696, filed Sept. 17, 1981, now U.S. Pat. No. 4,389,910 and assigned to the assignee of the present invention, and incorporated herein by reference. Such systems compensate for the driveline nonlinearity referred to above, but the operator of the vehicle must still make accelerator pedal adjustments in order to maintain a desired velocity under changing road load conditions as are typically encountered in highway or cruise-type driving.

Accordingly, it is an object of this invention to provide an improved motor vehicle control system that develops a power command for regulating engine and transmission operation, such system having alternately engageable modes of operation including a power mode of operation wherein the power command is developed so that the vehicle driveline power output linearly corresponds to the position of an operator-manipulated accelerator pedal, and a velocity mode of operation wherein the power command is developed so that the vehicle velocity is maintained at the velocity in effect when the velocity mode of operation is engaged.

It is a further object of this invention to provide an improved control system of the above type for switching between power and velocity modes of operation such that the power mode of operation is engaged while vehicle conditions indicate transient operation and such that the velocity mode of operation is engaged while vehicle conditions indicate steady state operation at substantially no acceleration.

It is yet a further object of this invention to provide an improved control system of the above type for switching between power and velocity modes of operation as a function of the vehicle acceleration and the accelerator pedal position such that the power mode of operation is disengaged and the velocity mode of operation is engaged when the accelerator pedal position is substantially constant and the vehicle acceleration is substantially zero, and such that the power mode of operation is engaged and the velocity mode of operation disengaged when the position of the operator-manipulated accelerator pedal is adjusted.

It is a still further object of this invention to provide an improved control system of the above type wherein the power command is developed so as to effect a smooth transition of the driveline power output when switching between the power and velocity modes of operation.

According to this invention, vehicle conditions including accelerator pedal position and vehicle acceleration are monitored as an indication of the intended vehicle operation. When transient vehicle operation is indicated, a power mode of operation is engaged to establish a linear relation between the driveline power output of the vehicle and the accelerator pedal position. When steady state vehicle operation is indicated, a velocity mode of operation is engaged to maintain the vehicle velocity despite road load variation. In either case, the control system of this invention develops a power command which represents the driveline power output required to attain the above-described control responses. A power control mechanism is responsive to such power command and effects engine throttle and transmission ratio adjustments to bring the actual driveline power output into correspondence with the power command. As indicated earlier, one such power control mechanism is disclosed in the U.S. Pat. No. 4,389,910.

By alternately engaging the power mode of operation and the velocity mode of operation, the control system of this invention produces a vehicle response (power output and velocity) which conforms to the expectations of the operator as communicated to the control system through manipulation of the accelerator pedal. When the accelerator pedal is initially depressed, the vehicle accelerates toward a desired velocity at a rate or power level that directly corresponds to the accelerator pedal setting. When the accelerator pedal position and the vehicle velocity remain substantially constant for a given period of time, it is assumed that the vehicle has achieved the desired velocity and that under current road load conditions, the power setting in effect will maintain that velocity. At such point, the power mode of operation is disengaged and the velocity mode of operation is engaged. So long as the above conditions are in effect, the driveline power output is adjusted as required to maintain the velocity in effect at the establishment of the velocity mode of operation. When the accelerator pedal position is significantly changed (more than 3% for example) it is assumed that the operator desires a different vehicle velocity. At such point, that power mode of operation is restored and the velocity mode of operation is disengaged so that the driveline power output is increased or decreased to accelerate the vehicle toward the new velocity (which is unknown) at a rate or power level corresponding to the accelerator pedal setting.

The control system of this invention thus responds to the operator's manipulation of the accelerator pedal to establish periods of operation at substantially constant velocity and periods of transitions therebetween at an acceleration rate or power output level determined by the operator. The resulting control system is both stable and responsive to the wishes of the operator.

A conventional cruise control switch may also be used according to this invention if the operator wishes to release the accelerator pedal and maintain a constant velocity. Actuation of the cruise switch operates to disengage the power mode of operation and to establish the velocity mode of operation so that the driveline power output is adjusted to maintain the then existing vehicle velocity.

The term "acceleration" as used herein, is meant to include both positive acceleration and negative acceleration or deceleration.

As indicated above, the control system of this invention is adapted to operate in conjunction with a power control mechanism that makes engine throttle and transmission ratio adjustments for bringing the actual driveline power output of a vehicle into correspondence with a power command. This invention relates to the development of a suitable power command to be operated on by such a power control mechanism for achieving the control responses claimed herein. Accordingly, the exact nature of the power control mechanism is unrelated to this invention. In order to facilitate description of this invention, however, portions of the power control mechanism disclosed in the above-referenced U.S. Pat. No. 4,389,910, are depicted and referred to herein.

IN THE DRAWINGS

Figure 1:
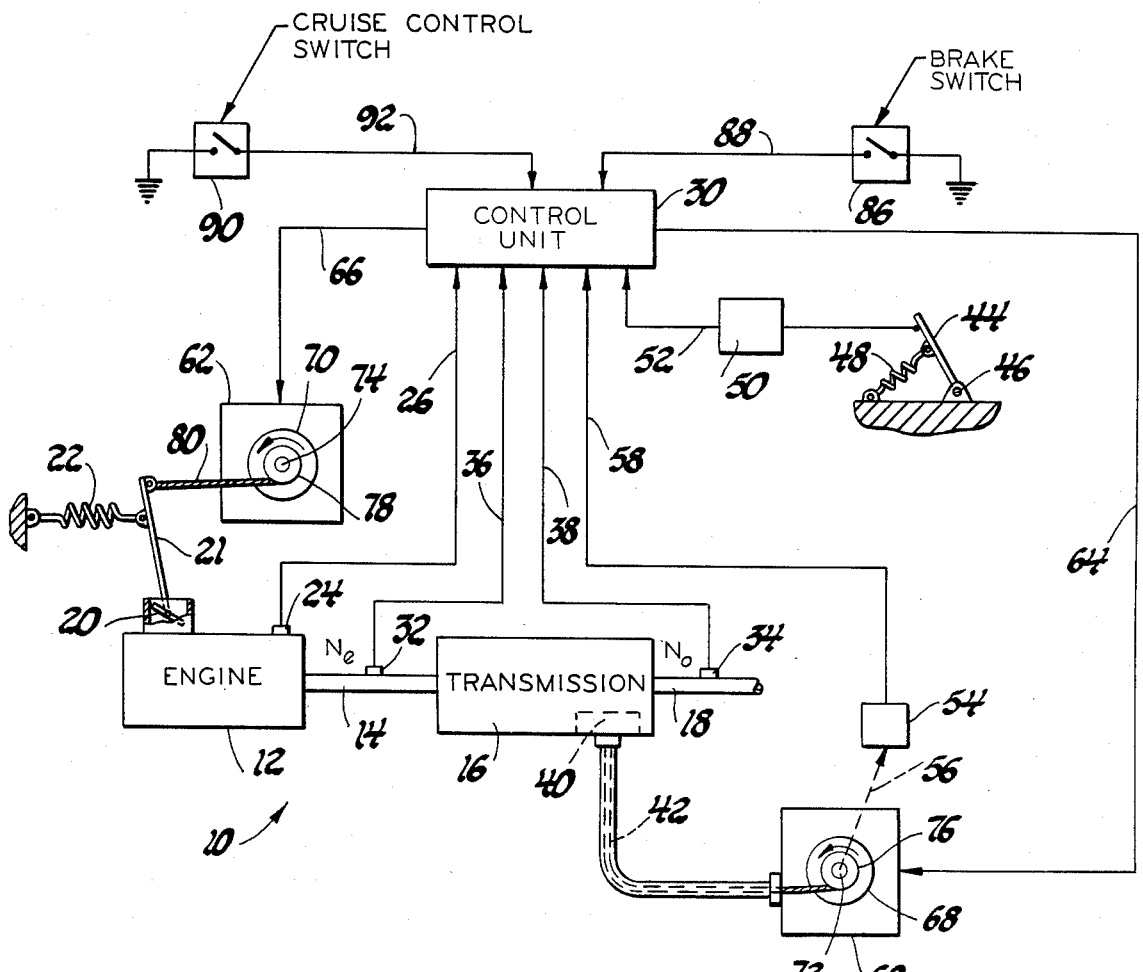
FIG. 1 is an overall schematic diagram of the vehicle and control unit.

Referring now more particularly to FIG. 1, reference numeral 10 generally designates a motor vehicle drive train comprising an engine 12, an engine output shaft 14, a hydraulic multigear ratio automatic transmission 16, and an output shaft 18 adapted to propel the vehicle. Engine 12 is illustrated as an internal combustion engine having a throttle plate 20 for adjusting the engine power output. Linkage member 21 is connected to throttle plate 20 for controlling its position and spring 22 is connected between a fixed support and linkage member 21 in a manner to urge throttle plate 20 to a closed position. Pressure sensor 24 is responsive to the engine manifold absolute pressure (MAP) and provides an input signal to control unit 30 in accordance therewith via line 26. Speed transducers 32 and 34 are responsive to the rotational speeds $N_e$ and $N_o$ of output shafts 14 and 18, respectively, and provide input signals in accordance therewith to control unit 30 via lines 36 and 38, respectively. Speed transducers 32 and 34 may be any transducers which are adapted to provide a digital output signal corresponding to the angular velocity of a rotating shaft, one such transducer being a variable reluctance magnetic pickup cooperating with a toothed gear fixed to the rotating shaft.

Accelerator pedal 44 pivots around pin 46 and spring 48 urges accelerator pedal 44 to the upright position as shown. The position of pedal 44 is manipulated by the operator of the vehicle to provide an indication of the desired driveline power output, and transducer 50 is responsive to the movement of pedal 44 for providing an electrical signal in accordance therewith to control unit 30 via line 52. Transducer 50 may be any device meeting the above requirements, one such device being a rotary potentiometer with its wiper connected to the pedal 44.

Reference numeral 40 generally designates a hydraulic throttle valve assembly within transmission 16 for developing a variable fluid pressure (TV pressure) in transmission 16 as a function of the position of the throttle valve (TV) cable 42. The throttle valve assembly 40 may be a conventional transmission component such as the throttle valve assembly disclosed and described in detail in the Schuster U.S. Pat. No. 3,893,472, issued July 8, 1975, which has been assigned to the assignee of the present invention. Generally speaking, the throttle valve assembly 40 develops a fluid pressure in the transmission 16 according to the position of TV cable 42 and such pressure is directed to the various transmission shift valves (not shown) for influencing transmission gear shifting. When the TV cable 42 is let out or released, such pressure is at a minimum and does not influence transmission shifting. When the TV cable 42 is pulled out against the force of a spring mechanism (not shown) in the throttle valve assembly 40, such pressure increases and operates to initiate a downshift sooner than would otherwise be attained.

Motor units 60 and 62 are actuated by control unit 30 via lines 64 and 66 to control the settings of transmission TV cable 42 and engine throttle plate 20. Motor units 60 and 62 each comprise an electric motor 68 or 70 having an output shaft 72 or 74 and a pulley 76 or 78 rigidly connected thereto.

Cable 80 is connected to linkage member 21 and to pulley 78 as shown, so that when control unit 30 actuates electric motor 70 in a counterclockwise direction, linkage member 21 is moved against the force of spring 22 to open the setting of throttle plate 20. When motor 70 is actuated in a clockwise direction, spring 22 and linkage member 21 move throttle plate 20 toward the closed position. In the event of an electrical failure, spring 22 operates to return throttle plate 20 to the fully closed position. TV cable 42 is connected to pulley 76 so that when control unit 30 actuates motor 68, TV cable 42 is moved to change the pressure developed by throttle valve assembly 40 in transmission 16. Transducer 54 is responsive to the rotary position of motor output shaft 72, as indicated by dashed line 56, and provides an electrical signal in accordance therewith to control unit 30 via line 58. As with transducer 50, transducer 54 may be a rotary potentiometer having its wiper connected to the output shaft 72.

Brake switch 86 is responsive to actuation of the vehicle brakes. The brake switch 86 is open as shown when the brake pedal (not shown) is released, and is closed when the brake pedal is depressed. One side of switch 86 is connected to ground potential and the other side is connected via line 88 as an input to control unit 30 to thereby provide an indication to control unit 30 of brake pedal actuation.

Cruise control switch 90 may be a conventional pushbutton switch mounted in the vehicle passenger compartment and preferably includes a resilient mechanism (not shown) for biasing the switch to the open position as shown. One side of switch 90 is connected to ground potential and the other side is connected via line 92 as an input to control unit 30 to provide an indication of the cruise control switch actuation. As will later become apparent, the function of the cruise control switch 90 from the operator's point of view, is identical to cruise control switches found in current production vehicles.

As indicated above, portions of the power control mechanism disclosed in U.S. Pat. No. 4,389,910, are depicted and referred to herein in order to facilitate the description of the present invention. Obviously, the present invention is not limited to the illustrated power control mechanism elements, nor is it limited to the illustrated type of engine and transmission. For example, transmission 16 may be of the type wherein ratio shifting is controlled through selective energization of a plurality of solenoid-operated valves, and engine 12 may be of the unthrottled type (Diesel). In such case, motor drives 60 and 62 would not be needed to interface control unit 30 to engine 12 and transmission 16. The illustrated embodiment and the above example, are but two of many possible motor vehicle powertrain configurations to which this invention finds application, and it will be understood that further reference herein to the illustrated embodiment is only to facilitate a complete description of the present invention.

Figure 2:
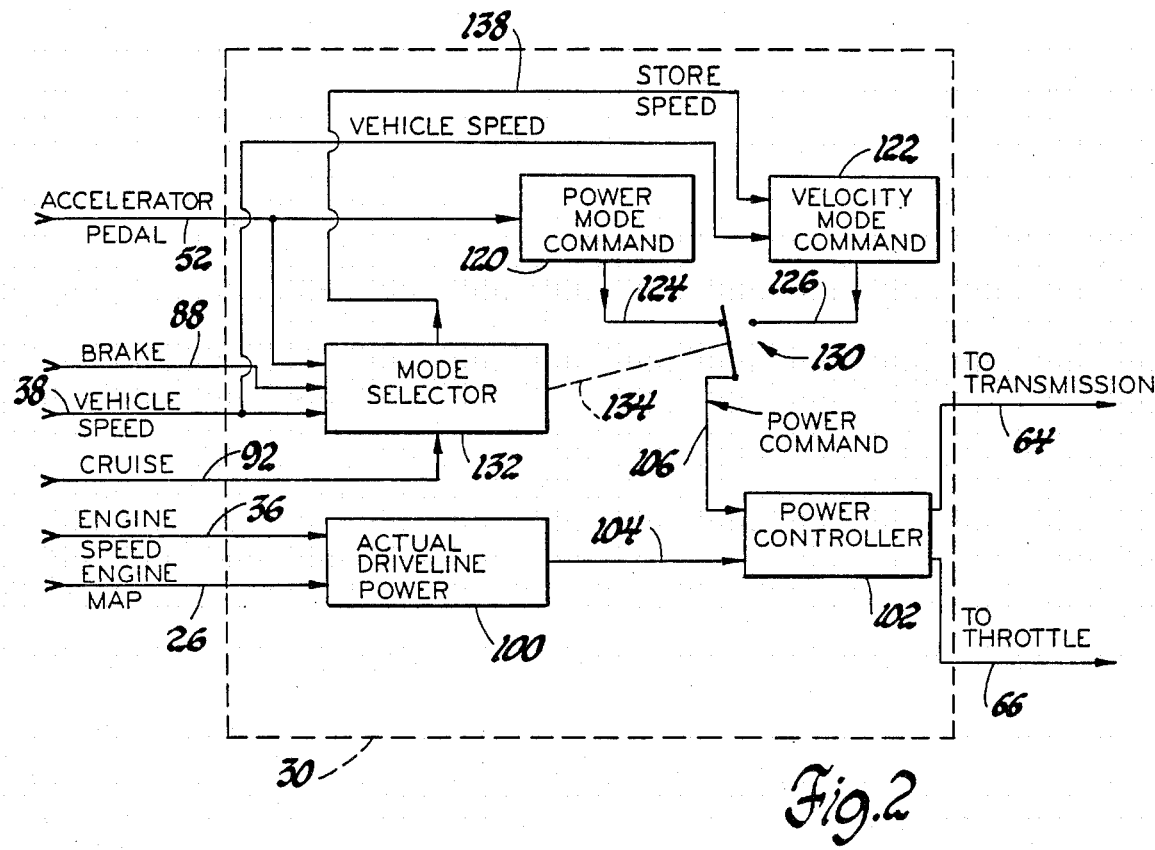
FIG. 2 is a conceptual diagram of the control functions performed by the control unit depicted in FIG. 1.

FIG. 2 is a conceptual diagram of the control functions performed by control unit 30. Thus, control unit 30 is designated by the dashed box which surrounds the various control function blocks. The inputs and outputs to control unit 30 are the same as shown in FIG. 1; thus, the accelerator pedal position signal, the brake signal, the vehicle speed signal, the cruise switch signal, the engine speed signal and the engine MAP signal are applied to control unit 30 via lines 52, 88, 38, 92, 36 and 26, respectively. The control signals for motor units 60 and 62 are outputted from control unit 30 via lines 64 and 66.

The power control mechanism portion of control unit 30 includes an actual driveline power output calculator 100 for determining the driveline power output as a function of the engine speed signal on line 36 and the engine manifold absolute pressure (MAP) signal on line 26, and a power control unit 102 responsive to a measure of the actual driveline power output on line 104 and to a power command signal on line 106 for controlling the transmission ratio and engine throttle position via lines 64 and 66. The elements 106–110 described briefly above, operate to control transmission gear shifting and engine throttle position in a manner to bring a measure of the actual driveline power output into correspondence with a power command signal, as fully described in the above-referenced U.S. patent.

The present invention relates to the development of a power command signal responsive to the accelerator position and to vehicle operating conditions so as to establish either a power mode of operation where the power command signal is developed according to the accelerator pedal position or a velocity mode of operation where the power command signal is developed as a function of the actual vehicle velocity and a remembered vehicle velocity in order to maintain the vehicle at the remembered velocity. The control unit 30, according to this invention, thus includes a power mode command generator 120 and a velocity mode command generator 122, the outputs of which are applied via lines 124 and 126 to switch unit 130. Switch unit 130 is connected to line 106, which as indicated above, provides a power command signal to the power control unit 102. Switch unit 130 is shiftable so as to connect either power mode command generator output line 124 or velocity mode command generator output line 126 to the power command signal line 106. The position of switch unit 130 thus determines whether the power mode of operation or the velocity mode of operation is engaged, the position of switch unit 130 being controlled by mode selector 132, as indicated by dashed line 134. The mode selector 132 responds to the accelerator pedal signal on line 52, the brake signal on line 88, the vehicle speed signal on line 38 and the cruise switch signal on line 92 so as to establish the proper mode of operation by controlling the position of switch unit 130. The mode selector 132 also operates upon establishing the velocity mode of operation to set the desired or remembered speed equal to the then existing speed as indicated by line 138. In this way, the velocity mode command generator 122 develops a power command signal on line 126 that will maintain the vehicle speed at the speed in effect at the establishment of the velocity mode of operation.

When mode selector 132 senses that the vehicle speed and the accelerator pedal position have remained substantially constant for a predetermined period, it is assumed that the vehicle has achieved the velocity desired by the operator. In such case, the mode selector 132 stores the current vehicle speed via line 138 and actuates switch unit 130 to engage line 126 and thereby establish the velocity mode of operation. Closure of the cruise switch 90 also operates to establish the velocity mode of operation and to store the existing vehicle speed via line 138. If the mode selector 132 senses movement of accelerator pedal 44 or the depressing of the brake pedal, it is assumed that the operator wishes to change the vehicle speed. In such case, mode selector 132 operates to shift the position of switch unit 130 so as to engage the power command generator output line 124, thereby disengaging the velocity mode of operation and establishing the power mode of operation so that the vehicle accelerates to the new speed at a rate or power level corresponding to the accelerator pedal position. When the new velocity is reached and the vehicle speed and accelerator pedal position remains substantially constant for a given time period, mode selector 132 shifts the position of switch unit 130 to establish the velocity mode of operation.

As indicated above, FIG. 2 is a conceptual diagram and, as such, does not depict physical elements within control unit 30. According to the preferred embodiment of this invention, the control functions represented by the conceptual diagram of FIG. 2 are implemented with a programmed microcomputer, as will be described below in reference to FIGS. 3–6.

Figure 3:
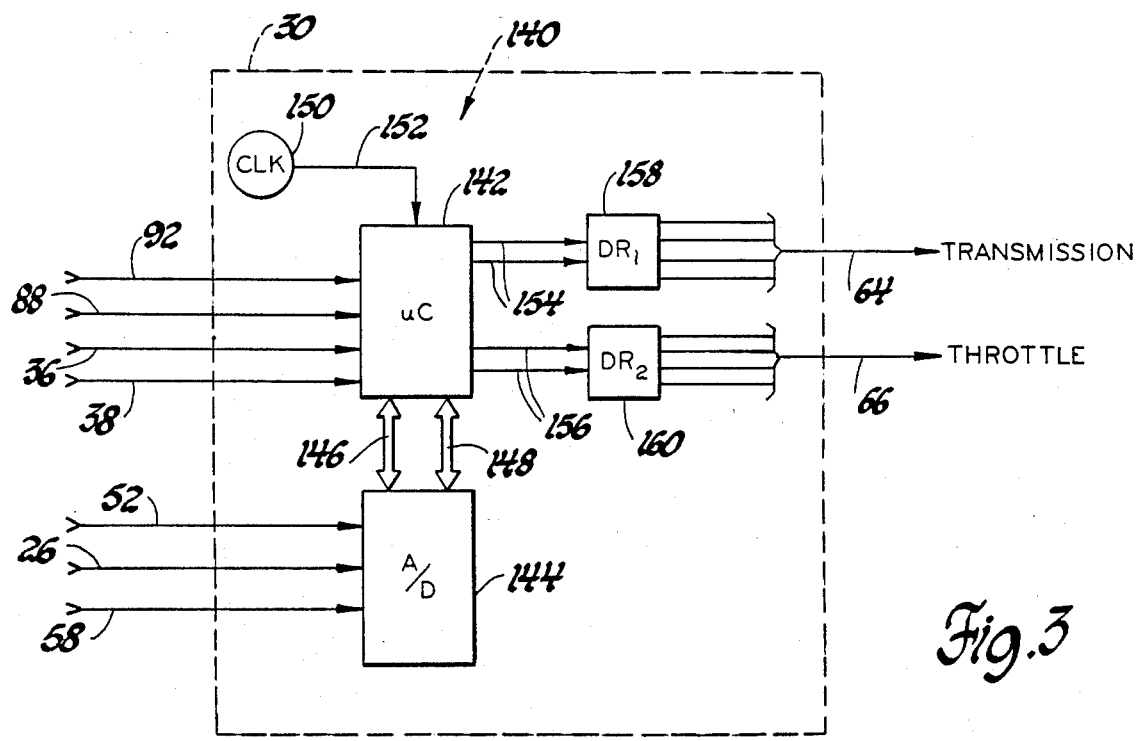
FIG. 3 is a block diagram depicting the major hardware elements of the control unit shown in FIG. 1 when the control functions of this invention are implemented with a programmed digital microprocessor.

Referring now to FIG. 3, reference numeral 140 generally designates a microcomputer-based controller for implementing the functions of control unit 30 according to the preferred embodiment of this invention. Controller 140 includes a Microcomputer (uC) 142, an Analog-to-Digital Converter (A/D) 144, a bidirectional Data Bus 146 and an Address and Control Bus 148. Clock 150 provides a high frequency pulse train to uC 142 via line 152 for controlling the timing of the operation of uC 142 and A/D converter 144. The above-mentioned components of controller 140 will be recognized and understood by those skilled in the art to be conventional and readily attainable parts. Preferably, uC 142 is the MC 6801 manufactured by Motorola Semiconductor Products, Inc. of Austin, Tex., and A/D converter 144 is an ADC0837 manufactured by Analog Devices, Inc., Norwood, Mass.

Digital inputs, such as the cruise control signal on line 92, the brake signal on line 88, the engine speed signal on line 36, and the vehicle speed signal on line 38, are applied to digital input ports on uC 142 while analog signals, such as the accelerator pedal signal on line 52, the engine manifold absolute pressure signal on line 26, and the TV cable position signal on line 58, are applied as inputs to A/D converter 144 wherein they are converted from an analog format to a digital format acceptable to uC 142. The transmission TV cable and engine throttle control output signals from uC 142 are applied via lines 154 and 156 to power output drivers 158 and 160, respectively. The output of driver 158 is applied to transmission TV cable motor unit 60 via line 64 and the output of driver 160 is applied to the engine throttle motor unit 62 via line 66. It will be understood by those skilled in the art, that power driver devices 158 and 160 also represent conventional readily obtainable electronic devices.

Figure 4:
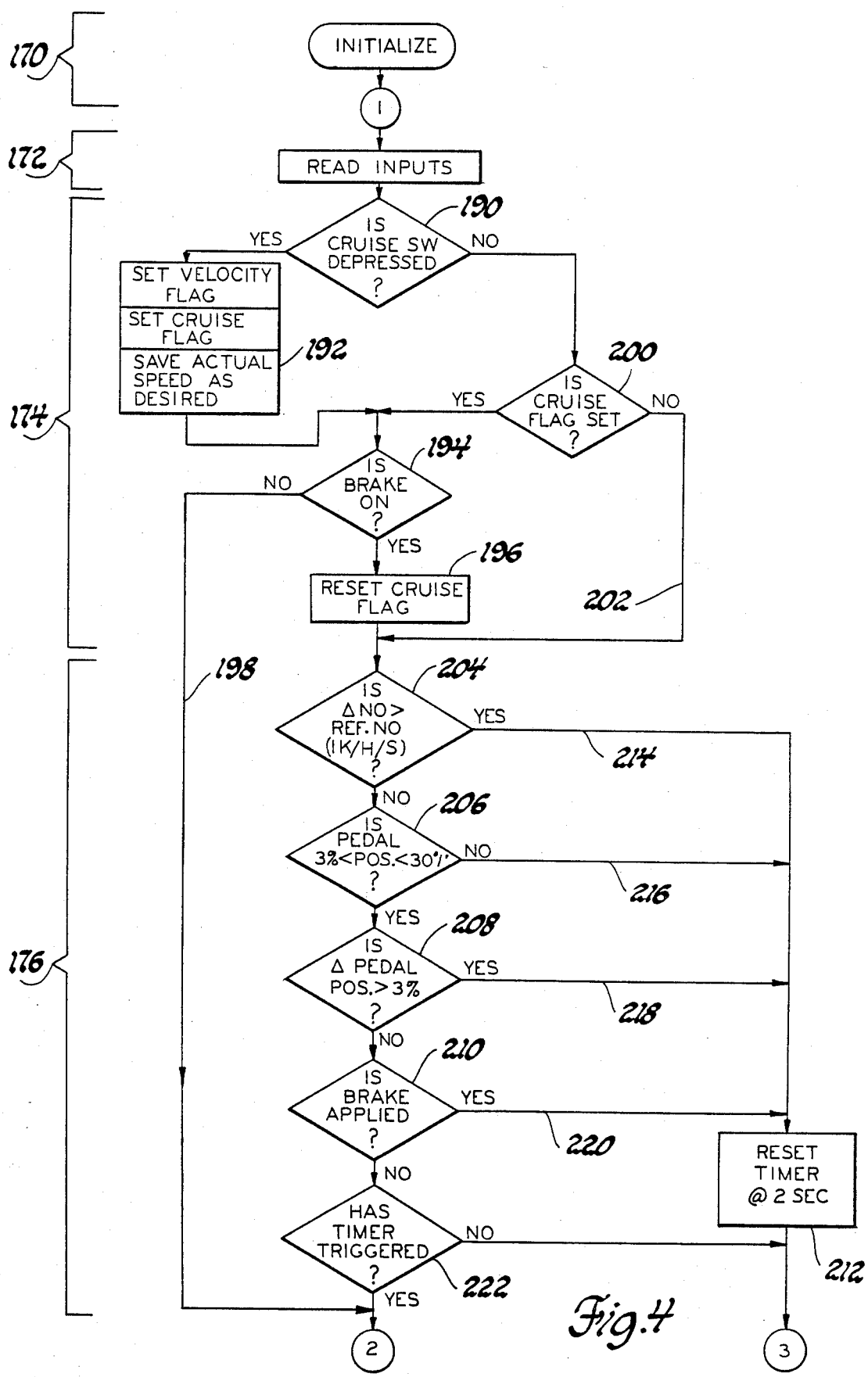
FIGS. 4 and 5 are flow diagrams for implementing the control functions of this invention with the programmed digital microprocessor depicted in FIG. 3.
Figure 5:
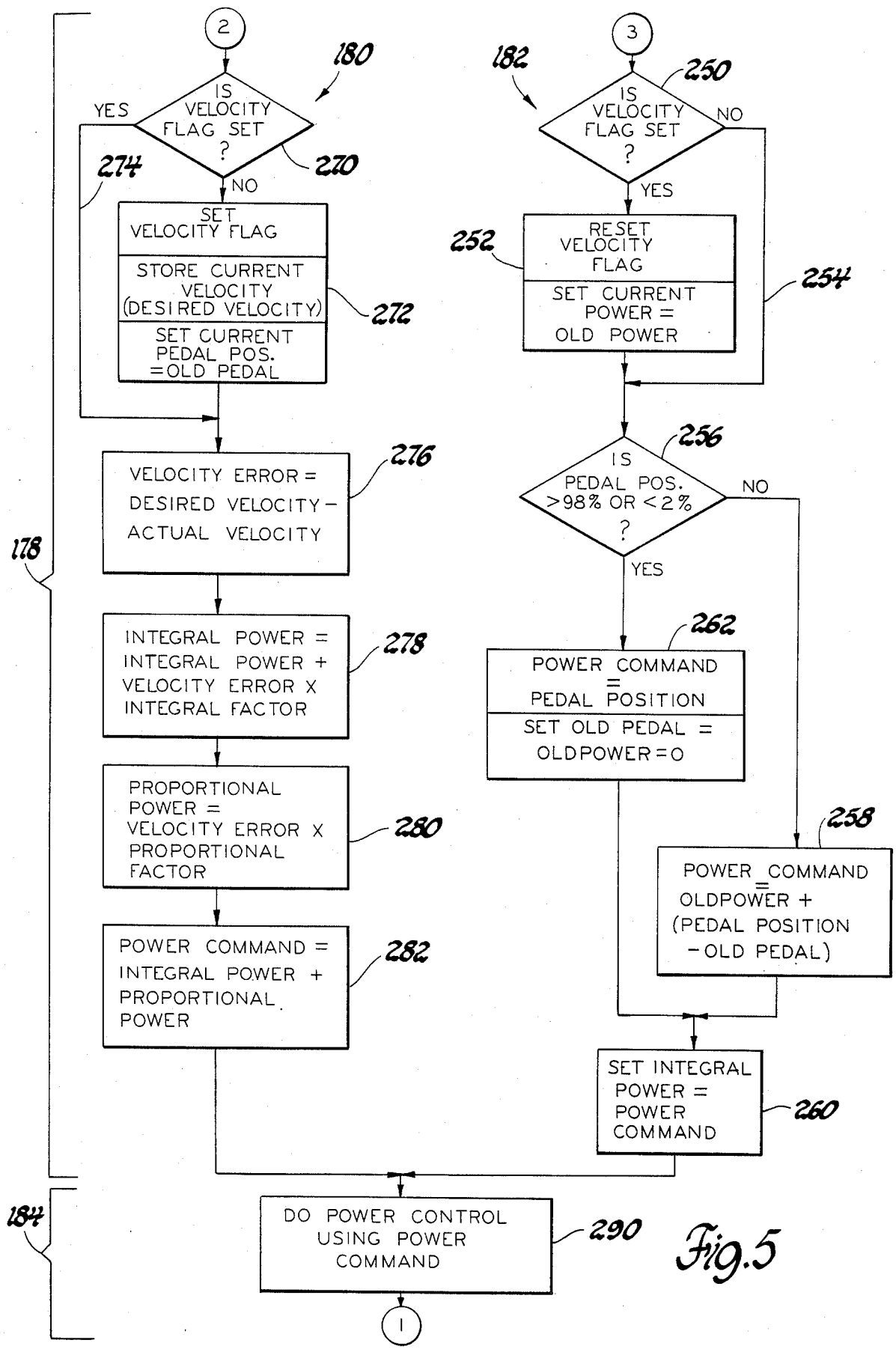

FIGS. 4 and 5 together represent a flow diagram for implementing the control functions of this invention with the microcomputer-based controller depicted in FIG. 3. Circled numerals 1-3 are used to indicate a connection from one part of the flow diagram to another part of the flow diagram where it is not feasible to draw a flow diagram line. As will be well-understood by those skilled in the art, the various flow diagram blocks contain functional language representative of program instructions for performing the indicated functions.

Referring now more particularly to FIGS. 4 and 5, the flow diagram depicted therein is separated into a number of parts according to function. Flow diagram portion 170 is executed each time the motor vehicle is started and operates to reset the various control and input registers. Flow diagram portion 172 operates to read the various input parameters such as engine and vehicle speed, accelerator pedal position and the various switch positions, and to store such values for future use. Flow diagram portion 174 relates to the so-called cruise control function. According to this invention, depression of the cruise switch 90 by the operator causes the velocity mode of operation to be established so as to maintain the existing vehicle velocity. Flow diagram portion 176 operates to determine whether the various vehicle parameters indicate transient or steady state vehicle operation. If the vehicle parameters indicate transient operation, the power mode of operation should be established. If the vehicle parameters indicate steady state operation, the velocity mode of operation should be established. Flow diagram portion 178 relates to the development of a suitable power command. The lefthand branch of flow diagram portion 178 is designated generally by reference numeral 180, and is executed when the velocity mode of operation is to be established. The righthand branch of flow diagram portion 178 is designated generally by reference numeral 182, and is executed when it is determined that the power mode of operation should be established. Flow diagram portion 184 relates to the functions of the power control mechanism—development of suitable transmission ratio and engine throttle adjustments for bringing the actual driveline power output into correspondence with the power command determined by flow diagram portion 178. Flow diagram portion 184 is only generally illustrated since it is a function that has been performed by prior art control systems, one such being described in detail in the above-referenced U.S. Pat. No. 4,389,910.

After flow diagram portions 170 and 172 have been executed to initialize system operation and to read fresh input values, instruction block 190 is executed to determine whether the cruise switch 90 is depressed (closed). If so, a pair of suitable memory locations within uC 142 designated as a velocity flag and a cruise flag are set to indicate that cruise control operation is requested and that the velocity mode of operation should be established, as shown at instruction block 192. At the same point, the actual vehicle velocity is stored as the desired velocity. Instruction block 194 is then executed to determine whether the vehicle brakes are applied. If so, instruction block 196 is executed to terminate the cruise control operation by resetting the cruise flag. If the vehicle brakes are not applied, cruise control operation is indicated and the execution of instruction block 196 and flow diagram portion 176 is skipped as indicated by flow diagram line 198.

If it is determined at instruction block 190 that the cruise control switch is not depressed, instruction block 200 is executed to determine if the cruise flag had previously been set. If so, a desired speed has already been stored and instruction block 194 is executed as described above. If it is determined at instruction block 200 that the cruise flag is not set, cruise control operation is not indicated and the execution of instruction blocks 194 and 196 is skipped as indicated by flow diagram line 202.

As noted above, flow diagram portion 176 relates to the determination of whether steady state or transient operating conditions exist. The vehicle operating conditions tested include: vehicle acceleration, accelerator pedal position, change in accelerator pedal position, and application of the vehicle brakes. If the vehicle acceleration is less than 1 kilometer/hour/sec, as determined at instruction block 204, steady state operation is indicated. If not, transient operation is indicated. The vehicle acceleration may be obtained by comparing successively determined values of vehicle speed. If the accelerator pedal position is in the normal cruise range of 3% to 30%, as determined at instruction block 206, steady state operation is indicated; if not, transient operation is indicated. If the accelerator pedal position has changed by more than 3% since last checked, as determined at instruction block 208, transient operation is indicated; if not, steady state operation is indicated. If the vehicle brakes are applied, as determined at instruction block 210, transient operation is indicated; if not, steady state operation is indicated.

Although the above conditions are somewhat arbitrary, they are generally indicative of the intended vehicle operation and serve to establish whether the vehicle performance is in line with the desires of the operator.

According to this invention, the velocity mode of operation is to be established if steady state vehicle operation is indicated for a predetermined time period.

In the illustrated embodiment, such predetermined time period is determined by a timer internal to uC 142, and has a duration of two seconds. The timer may be reset by the execution of a suitable program instruction, such as represented by instruction block 212, and if the time period elapses before the timer is reset, the timer produces a logic output or trigger signal. Each time the execution of instruction blocks 204 or 206 or 208 or 210 indicates transient operation, the timer is reset as indicated by flow diagram lines 214, 216, 218 and 220, respectively. If each of the above described vehicle conditions indicate steady state operation for two seconds or longer, the timer will trigger, indicating that the velocity mode of operation should be established. If the timer does not trigger, the power mode of operation should be established. Accordingly, instruction block 222 is executed after each of the conditions are checked for determining if the timer has triggered. If so, the lefthand branch 180 of flow diagram portion 178 is executed to establish the velocity mode of operation. If not, the righthand branch 182 of flow diagram portion 178 is executed to establish the power mode of operation.

Figure 6:
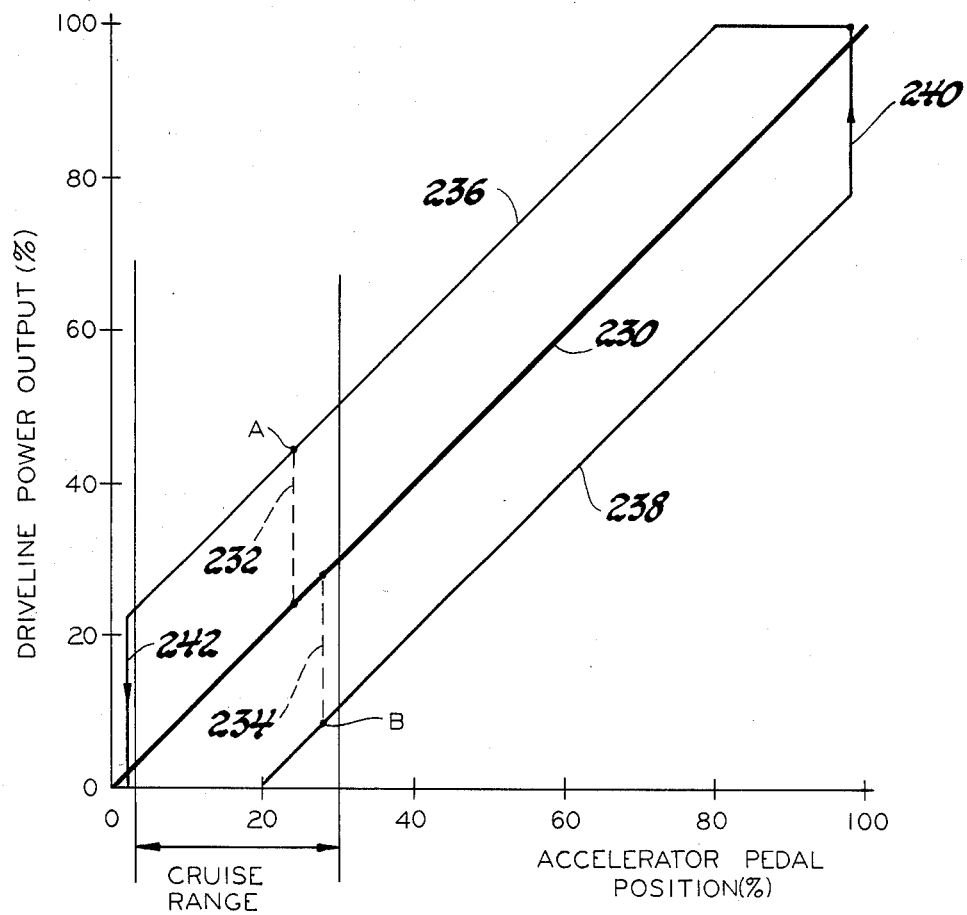
FIG. 6 is a graph depicting the relation between driveline power output and accelerator pedal position according to this invention.

As briefly described in reference to FIG. 2, the function of the power mode of operation is to develop a power command which is directly related to the accelerator pedal position, thereby providing a linear relationship between accelerator pedal position and driveline power output. The function of the velocity mode of operation is to develop a power command which will maintain the vehicle at the velocity in effect when the velocity mode of operation is established. The resulting relationships between accelerator pedal position and driveline power output are graphically depicted in FIG. 6, where both driveline power output and accelerator pedal position are expressed as a percentage of their maximum values. The heavy trace designated by reference numeral 230 defines the baseline relationship between accelerator pedal position and driveline power output in the power mode of operation. According to the preferred embodiment, and as depicted in FIG. 6, the baseline relationship establishes a one-to-one correspondence between accelerator pedal position and driveline power output on a percentage basis. Thus, an accelerator pedal position of 60%, for example, produces a power command which corresponds to 60% of the available driveline power output.

The cruising or steady state range of accelerator pedal positions, which is defined by instruction block 206 in FIG. 4, is also depicted in the graph of FIG. 6. Thus, the velocity mode of operation may only be established when the accelerator pedal position is between 3% and 30% of its full travel. When the velocity mode of operation is established, the accelerator pedal position remains constant while the power output is adjusted to maintain the vehicle velocity. Typical power adjustments of the above type are designated in FIG. 6 by the dashed lines 232 and 234. Trace 232 represents a driving condition wherein the road load increases after the establishment of the velocity mode of operation and wherein the driveline power output is appropriately increased to maintain the vehicle velocity. Trace 234 represents a driving condition wherein the road load decreases after the establishment of the velocity mode of operation and wherein the driveline power output is appropriately decreased to maintain the vehicle velocity. Either situation results in a deviation from the baseline relation depicted by trace 230. For instance, at point A on trace 232, the accelerator pedal position is at 24% while the driveline power output is at 44%. Similarly, at point B on trace 234, the accelerator pedal position is at 28% while the driveline power output is at 8%.

An important aspect of this invention relates to the development of a suitable power command when switching from the velocity mode of operation to the power mode of operation. As indicated above, the baseline relation depicted by trace 230 between the driveline power output and the accelerator pedal position may be disturbed by operation in the velocity mode of operation, such as shown by traces 232 and 234. When the velocity mode of operation is interrupted and the power mode of operation is established, it is important to once again define a direct and linear relation between accelerator pedal movement and change in the driveline power output. That is, once the power mode of operation is established, a 20% change in accelerator pedal position should still produce a 20% change in the driveline power output, regardless of the actual accelerator pedal position. For the situation of increased road load during the velocity mode of operation, as depicted by trace 232, subsequent establishment of the power mode of operation operates to redefine the relation between the driveline power output and accelerator pedal position as shown by the trace 236. In such case, the relation between power output and accelerator pedal position is still direct and linear but is shifted up relative to the baseline relation due to the power output adjustment made during the velocity mode of operation. As a result, power output adjustments upon establishment of the power mode of operation commence at the existing power output level so as to effect a smooth transition between modes of operation. For the situation where the power output is decreased during the velocity mode of operation, as depicted by trace 234, subsequent establishment of the power mode of operation operates to redefine the relation between the driveline power output and the accelerator pedal position as shown by the trace 238. In such case, the relation between power output and accelerator pedal position is still direct and linear but is shifted down relative to the baseline relation due to the power adjustment made during the velocity mode of operation. As a result, power adjustments upon establishment of the power mode of operation commence at the existing power level so as to effect a smooth transition between modes of operation.

The difficulty occasioned by the redefinition of the relation between driveline power output and accelerator pedal position as depicted in FIG. 6 by traces 236 and 238 is that the accelerator pedal position no longer directly corresponds to the driveline power output. With trace 236, for example, 80% depression of the accelerator pedal provides 100% of the available driveline power output while the complete release of the accelerator pedal provides 20% of the available power output. Similarly with trace 238, full depression of the accelerator pedal provides 80% of the available power output while an accelerator pedal position of 20% provides the minimum driveline power output. The difficulty outlined above is overcome according to a first aspect of this invention by redefining the relation between the driveline power output and the accelerator pedal position each time the power mode of operation is established so that deviations from the baseline relation which occur during the velocity mode of operation are not cumulative. According to another aspect of this invention, the difficulty outlined above is overcome by restoring the baseline relation between power output and accelerator pedal position each time the accelerator pedal is substantially released or fully depressed. Due to the restoring of the baseline relation as described above, the various power versus accelerator pedal position relations, as exemplified by traces 236, 238, converge with trace 230 at the point of calibration as indicated by the trace 240 when the accelerator pedal is substantially fully depressed and by the trace 242 when the accelerator pedal is substantially released.

Referring now to the righthand branch 182 of flow diagram portion 178 which establishes the power mode of operation, it is first determined at instruction block 250 if the velocity flag is set. If so, the velocity mode of operation is in effect and instruction block 252 is executed to interrupt the velocity mode of operation and to establish a power mode of operation by resetting the velocity flag and by saving the current power level, OLD POWER. If, on the other hand, the velocity flag is not set, execution of instruction block 252 is skipped as indicated by flow diagram line 254. It is then determined, as indicated at instruction block 256 if the accelerator pedal is released (less than 2%) or fully depressed (greater than 98%). If not, instruction block 258 is executed to develop a power command according to the power in effect at the establishment of the power mode of operation (OLD POWER), adjusted by the difference between the actual accelerator pedal (PEDAL POSITION) and the accelerator pedal position in effect the last time the velocity mode of operation was established (OLD PEDAL). When the vehicle operation is initialized, flow diagram portion 170 resets the values of OLD POWER and OLD PEDAL to zero so that the initial relation between driveline power output and accelerator pedal position is given by the baseline trace 230 in FIG. 6. When the power mode of operation is established following the establishment of a velocity mode of operation, the values of OLD POWER and OLD PEDAL will likely be non-zero and the relation between driveline power output and accelerator pedal position may be as shown by traces 236 or 238 in FIG. 6. In such case, the degree of deviation from the baseline trace 200 is a function of the power output adjustment required to maintain the vehicle velocity during the most recent establishment of the velocity mode of operation. After determining the power command at instruction block 258, instruction block 260 is executed to set the term INTEGRAL POWER equal to such power command so that when the velocity mode of operation is next established, power output adjustments commence at the existing power command value.

If it is determined at instruction block 256 that the accelerator pedal is released (less than 2%) or fully depressed (greater than 98%), instruction block 262 is executed to develop a power command equal to that of the accelerator pedal position, thereby restoring the baseline relationship between driveline power output and accelerator pedal position. At the same time, the terms of OLD PEDAL and OLD POWER are reset to zero so that subsequent variations in the driveline power output are made along the baseline trace 230 depicted in FIG. 6. After the power command is determined, instruction block 260 is executed to set the term INTEGRAL POWER equal to such power command, as explained above.

Referring now to the lefthand branch 180 of flow diagram portion 178, instruction block 270 is first executed to determine whether the velocity flag is set. If not, the power mode of operation is in effect and instruction block 272 is executed to establish the velocity mode of operation by setting the velocity flag and storing the current vehicle velocity as DESIRED VELOCITY. At the same time, the current accelerator pedal position is saved as OLD PEDAL for use when the power mode of operation is reestablished. If the velocity flag is set, then the velocity mode of operation is already in effect and the execution of instruction block 272 is skipped as indicated by flow diagram line 274. Instruction block 276 is then executed to determine the VELOCITY ERROR according to the difference between the DESIRED VELOCITY and the actual velocity. VELOCITY ERROR is then used as indicated at instruction blocks 278, 280 and 282 to develop a power command for maintaining the actual velocity equal to DESIRED VELOCITY. Instruction block 278 is executed to determine a cumulative or integral power term and instruction block 280 is executed to determine a noncumulative, proportional power term. The power command is then determined as indicated at instruction block 282 according to the sum of the integral and proportional power terms. The above-described power command determination will be recognized by those skilled in the art as a conventional proportional-plus-integral feedback, the proportional and integral factors being adjusted as required to obtain stable response and acceptable speed of response.

Once the power command is developed under either the power mode of operation or the velocity mode of operation, such power command is used by the power control mechanism to control the regulation of the engine throttle and transmission gear selection to bring the driveline power output into correspondence with the power command, as shown by instruction block 290. As indicated above, such operation does not form a part of this invention per se. However, an example of a suitable control mechanism is given in the U.S. Pat. No. 4,389,910.

The operation of this invention will now be described in detail with reference to FIGS. 4-6. When vehicle operation is initiated and the flow diagram instruction blocks are first executed, the various control registers are initialized at flow diagram portion 170. Then flow diagram portions 172 and 174 are executed to read the various input parameters and to determine whether cruise control operation is requested. If cruise operation is requested (as indicated by the status of the cruise flag or the cruise switch 90) and the brake is not on, the lefthand branch 180 of flow diagram portion 178 is executed as indicated by flow diagram 198 to establish the velocity mode of operation. If cruise control operation is not requested, the flow diagram portion 176 is executed to determine whether the vehicle conditions checked therein indicate transient or steady state operation. Obviously, steady state operation does not occur initially; accordingly righthand branch 182 of flow diagram portion 178 is executed to establish the power mode of operation. Since the terms OLD POWER and OLD PEDAL are reset to zero by flow diagram portion 170, the power command is determined according to the accelerator pedal position regardless of the decision at instruction block 256. The term INTEGRAL POWER is set equal to the power command and flow diagram portion 184 is executed to effect suitable throttle and transmission adjustments to bring the actual driveline power output into correspondence with the determined power command. As indicated by the circled numeral connector, flow diagram portion 172 is then executed to read new input parameter values, and the above-described process is repeated so long as the power mode of operation is appropriate. It will be recognized that the operation described above controls the driveline power output according to the baseline relationship depicted by trace 230 in FIG. 6. As such, a given percent depression of the accelerator pedal produces a like percent of the available driveline power output.

When steady state operation is indicated at flow diagram portion 176, the lefthand branch 180 of flow diagram portion 178 is executed to interrupt the power mode of operation and to establish the velocity mode of operation. In such case, the velocity flag is set and the current velocity and accelerator pedal position are saved as indicated at instruction block 272. A power command for maintaining such current velocity is then developed as a function of the velocity error according to the proportional-plus-integral routine outlined by instruction blocks 270–282 as described above, and such power command is used to adjust the engine throttle and transmission gear ratio to bring the actual driveline power output into correspondence therewith as indicated at instruction block 290. During such operation, the driveline power output is increased or decreased as required to maintain the velocity stored at the establishment of the velocity mode of operation (desired velocity) while the accelerator pedal position remains nearly constant. As such, the driveline power output is varied along a vertical line such as shown in FIG. 6, by traces 232 or 234. Assuming that the accelerator pedal position was at 24% when the velocity mode of operation was established, and that the road load subsequently increased requiring an increase in the driveline power output to maintain the desired velocity, power output adjustments would be along the trace 232. In such case, the current pedal position (OLD PEDAL) saved at instruction block 272 is 24%. Operation continues in the manner described above so long as all of the vehicle conditions outlined by flow diagram portion 176 indicate steady state operation. When it is determined that one or more of such conditions indicate transient operation, the righthand branch 182 of flow diagram portion 178 is executed to interrupt the velocity mode of operation and to establish the power mode of operation. At such time, the velocity flag is reset and the current driveline output power level is saved as OLD POWER, as indicated at instruction block 254. If the transient operation is indicated at point A on the trace 232 in FIG. 6, the power level saved as OLD POWER is 44%. Assuming that the accelerator pedal position is neither released nor fully depressed, the power command is determined according to the relation shown by instruction block 258—POWER COMMAND=OLD POWER+(PEDAL POSITION−OLD PEDAL). As a result, driveline power output variations are made along the trace 236 rather than along the baseline trace 230. As mentioned earlier, such determination of the power command provides a smooth transition between the velocity mode of operation and the power mode of operation, and maintains the direct and linear relation between accelerator pedal movement and power output adjustment. At such time, the term INTEGRAL POWER is set equal to the power command so that when the velocity mode of operation is reestablished, power command adjustments commence at the existing power level.

As mentioned earlier, the difficulty occasioned by operation under a power output versus pedal position relation such as depicted by the trace 236 in FIG. 6, is that there is no longer a one-to-one correspondence between accelerator pedal position and driveline power output. On trace 236, for example, an accelerator pedal position of 80% or greater produces the maximum driveline power output, and an accelerator pedal position of 0% produces a driveline power output of 20%. Such difficulty is overcome according to this invention by restoring the power output/accelerator pedal relation to the baseline relation (trace 230) whenever the accelerator pedal is released or fully depressed. If in the operation described above, the accelerator pedal is fully depressed (greater than 98%) the power command is set equal to the pedal position, and the terms OLD PEDAL and OLD POWER are reset to zero as indicated at instruction block 262. Such recalibration is depicted by the trace 240 in FIG. 6. If instead the accelerator pedal is released (less than 2%), instruction block 262 is executed to recalibrate the power/pedal position relation by setting the power command equal to the accelerator pedal position. Such recalibration is depicted by the trace 242 in FIG. 6. In either case, the recalibration thereby restores the power output versus accelerator pedal position relation to the baseline relation depicted by trace 230 wherein there exists a one-to-one correspondence between accelerator pedal position and driveline power output.

In the manner described above, the control system of this invention regulates the driveline power output of a motor vehicle so that the response of the vehicle conforms to the response desired by the operator. Whenever the operator desires to alter the vehicle velocity, as sensed by actuation of the brake or movement of the accelerator pedal, the power mode of operation is engaged to ensure that the driveline power output is varied in direct and linear relation to the movement of the accelerator pedal. When the vehicle has been accelerated to a new velocity and steady state operation is indicated, the velocity mode of operation is engaged to make adjustments in the driveline power output as required to maintain such new velocity. As a result, the amount of accelerator pedal manipulation required by the operator of the vehicle to achieve the desired response is significantly reduced.

If the operator wishes to release the accelerator pedal while maintaining the existing speed, depression of the cruise switch 90 operates to engage the velocity mode of operation regardless of the accelerator pedal position.

Since this invention relates to the development of a suitable power command for a motor vehicle power control mechanism, it will be understood that the fuel economy gains which may be occasioned by the operation of the power control mechanism—as described in the above-reference U.S. Pat. No. 4,389,910—are still realized in the motor vehicle controller described herein.

It will also be understood that although this invention has been described in reference to the illustrated embodiment, various modifications thereto may occur to those skilled in the art and such modifications may fall within the scope of this invention which is defined by the appended claims.

The embodiments of the invention in which an exclusive property or privilege is claimed are defined as follows:

1. In a motor vehicle drive system operable in a power mode or a velocity mode including power control means for controlling the power output of said drive system in a manner to bring the same into correspondence with a power command, the method comprising:

developing a power command for said power control means according to the position of an operator manipulated accelerator pedal to thereby establish a power mode of operation wherein the power output of said drive system is varied as a direct and substantially linear function of the accelerator pedal position;

monitoring vehicle operating conditions including accelerator pedal movement and vehicle velocity to determine when such conditions indicate substantially steady state vehicle operation and in response to such determination interrupting the power mode of operation and developing a power command for said power control means as a function of the actual vehicle velocity to thereby establish a velocity mode of operation wherein the vehicle velocity in effect at the establishment thereof is maintained substantially constant; and monitoring accelerator pedal movement as an indication of the power response desired by the operator of the vehicle and restoring the power mode of operation when the accelerator pedal is moved by more than a predetermined amount so that the driveline power output between periods of substantially constant velocity under said velocity mode of operation is developed in direct and linear relation to the position of said accelerator pedal to produce the power response desired by the operator.

2. A method as set forth in claim 1 wherein: interruption of the power mode of operation is inhibited until the monitored vehicle operating conditions continuously indicate substantially steady state vehicle operation for a predetermined time interval.

3. A method as set forth in claim 1 wherein: the monitored operating conditions include rate of change of vehicle velocity and rate of accelerator pedal movement.

4. The method set forth in claim 1, including the step of:

immediately establishing the velocity mode of operation without regard to the vehicle operating conditions of accelerator pedal movement and rate of change of vehicle velocity in response to actuation of a cruise switch by the operator of the vehicle which indicates that constant velocity operation is desired.

5. A method as set forth in claim 1, wherein: the monitored operating conditions include rate of change of vehicle velocity, rate of accelerator pedal movement, and application of a vehicle brake.

6. In a motor vehicle drive system including a power control mechanism for adjusting the power output of the drive system to bring the same into correspondence with a power command, the method comprising:

developing a power command for said power control mechanism according to the position of an operator manipulated accelerator pedal, thereby establishing a baseline relation between the power output of said drive system and the position of said accelerator pedal, which relation is substantially direct and linear; and thereafter monitoring vehicle operating conditions including accelerator pedal position and vehicle velocity to determine if steady state vehicle operation is indicated;

engaging a velocity mode of operation when steady state vehicle operation is indicated and the position of said accelerator pedal is maintained substantially constant to develop a power command for said power control mechanism for maintaining the vehicle velocity in effect at the engagement of said velocity mode of operation whereby the power output of said drive system deviates from said baseline relation to the extent required to maintain the vehicle velocity; and interrupting the velocity mode of operation and engaging a power mode of operation when the position of said accelerator pedal is changed by more than a predetermined amount to develop a power command for said power control mechanism according to the power command in effect at the interruption of said velocity mode of operation, adjusted by the difference between the current accelerator pedal position and the accelerator pedal position in effect at the establishment of said velocity mode operation so that power command adjustments effected by said power mode of operation commence at the power command in effect at the interruption of the velocity mode of operation to thereby effect a smooth transition between the engagement of said power mode of operation and said velocity mode of operation.

7. In a motor vehicle drive system including a power control mechanism for controlling the drive system power output so as to bring the same into correspondence with a power command, the method comprising:

developing a power command for said power control mechanism according to the position of an operator manipulated accelerator pedal thereby establishing a baseline relation between the power output of said drive system and the position of said accelerator pedal, which relation is substantially direct and linear; and thereafter engaging a velocity mode of operation when steady state vehicle operation is indicated and the position of said accelerator pedal is maintained substantially constant to develop a power command for said power control mechanism for maintaining the vehicle velocity in effect at the engagement of said velocity mode of operation despite variations in road load, whereby the power output of said drive system deviates from the baseline relation by an amount corresponding to the power command adjustments effected by said velocity mode of operation;

interrupting the velocity mode of operation when the position of said accelerator pedal is substantially changed and engaging a power mode of operation to develop a power command for said power control mechanism according to the power command in effect at the establishment of said power mode of operation, adjusted by the difference between the current accelerator pedal position and the accelerator pedal position in effect at the establishment of said velocity mode of operation, thereby establishing a direct and linear relation between the power output of said drive system and the position of said accelerator pedal which is offset from said baseline relation by the amount corresponding to the power output deviation effected during the engagement of said velocity mode of operation; and monitoring the position of said accelerator pedal while said power mode of operation is engaged and reestablishing the baseline relation between the power output of said drive system and the accelerator pedal position when the pedal is substantially fully depressed or substantially released.

8. In a motor vehicle having a drive system including a power source, a variable ratio transmission, the improvement comprising:

means including a control unit for controlling the operation of the power source and the transmission so as to bring the power output of the drive system into correspondence with a power command;

for operating the vehicle in a power mode of operation in which the power command is developed such that the power output of the drive system is determined as a function of the position of an operator controlled accelerator pedal thereby to provide the power output and corresponding vehicle response desired by the operator;

for operating the vehicle in a constant speed mode of operation wherein the power command is developed such that the speed of the vehicle is maintained substantially constant at the vehicle speed in effect when the constant speed mode of operation is established;

for shifting operation of the vehicle from the power mode of operation to the constant speed mode of operation when the position of the accelerator pedal and the speed of the vehicle are each sufficiently constant for a sufficiently long period of time as to indicate that the operator desires to maintain the vehicle speed then in effect; and for shifting operation of the vehicle from the constant speed mode of operation to the power mode of operation when the position of the accelerator pedal is subsequently changed to such degree as to indicate that the operator desires to change the speed of the vehicle whereby the power output of the drive system and corresponding vehicle response during the speed change is under the control of the operator via the accelerator pedal.

* * * * *